July 31, 1928. Re. 17,054
C. A. LEWIS
WINDOW
Original Filed July 6, 1926
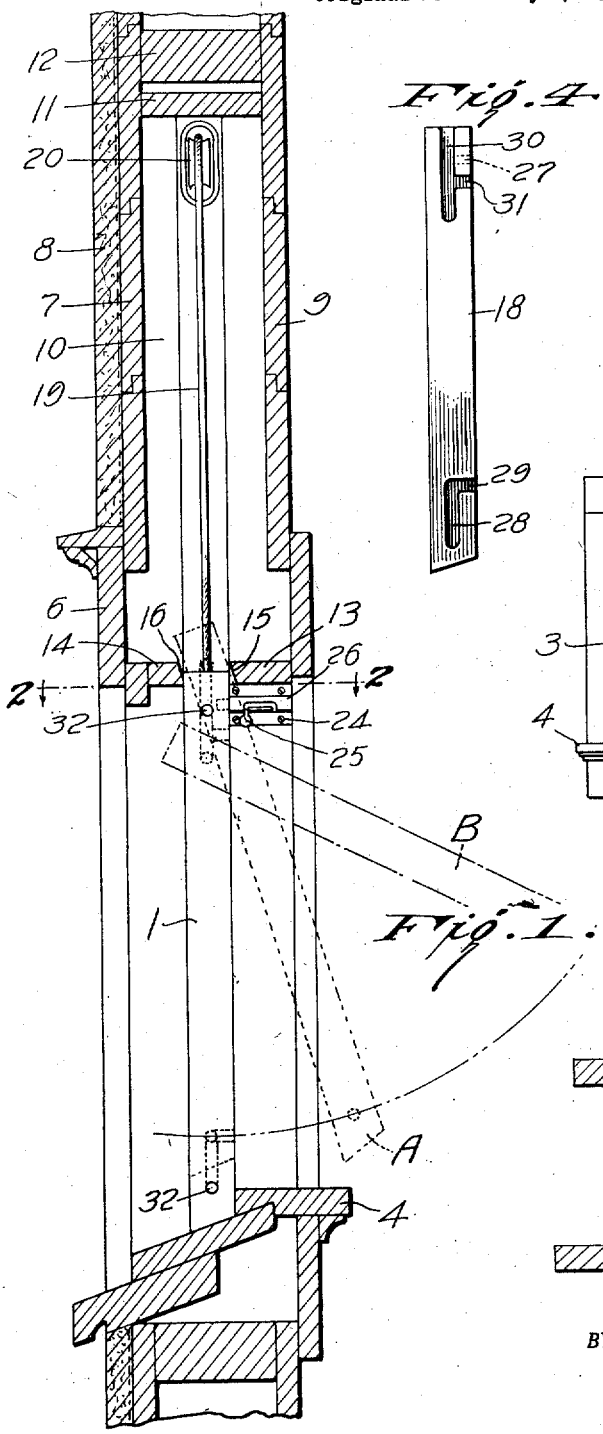
Fig. 1.
Fig. 4.
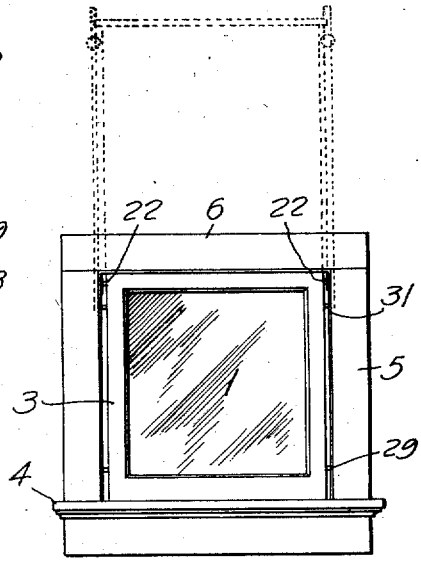
Fig. 3.
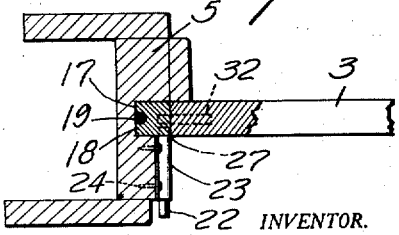
Fig. 2.
INVENTOR.
CLAUDE A. LEWIS,
BY Jesse R. Stone
ATTORNEY.

Reissued July 31, 1928. Re. 17,054

UNITED STATES PATENT OFFICE.

CLAUDE A. LEWIS, OF HOUSTON, TEXAS, ASSIGNOR TO AMERICAN WINDOW COMPANY, A CORPORATION OF DELAWARE.

WINDOW.

Original No. 1,641,390, dated September 6, 1927, Serial No. 120,600, filed July 6, 1926. Application for reissue filed December 24, 1927. Serial No. 242,465.

My invention relates to windows for use in building structures of any kind, such as factory or office buildings or in dwellings.

The present invention is an improvement upon the type of window set out in my prior application copending herewith, filed June 10th, 1926, Serial No. 115,141.

This window is of the smaller type, having one sash, said sash being adapted to slide upwardly into the casing above the window opening.

It is an object of the invention to provide means in such a window whereby the sash may be swung inwardly into the room so as to reverse the sash to reach the opposite side for cleaning or other purposes, and also to provide for removing the sash readily with a minimum of manipulation.

In the drawing illustrating the preferred embodiment of this invention, Fig. 1 is a central vertical section through a window equipped with my invention. Fig. 2 is a broken detail of the window casing and sash taken approximately on the line 2—2 of Fig. 1. Fig. 3 is an inside elevation of the window and casing, and Fig. 4 is a side elevation of one of the riders to which the sash is detachably secured. Like numerals of reference are employed to designate like parts in all the views.

In the drawing, I have illustrated a window 1 having a sash 3 thereon, said sash setting within a casing having a lower sill 4, side jambs 5 and an upper head piece 6. Above the casing the walls of the building structure are spaced apart to allow room for the sash to be raised. There is an outer wall 7, a facing 8 thereon of plaster or other similar material and an inner wall 9, said walls being spaced apart at the upper end of the compartment 10 by members 11 and 12. At the lower end of the compartment 10 is an inner cross plate 13 and outer cross plates 14. The plate 13 being beveled slightly on its lower face adjacent the sash opening, as shown at 15, and the outer cross plate 14 being beveled slightly at 16 on its upper face adjacent the sash. This is to allow the movement of the sash in swinging it into reversed position.

On each side of the sash the window jamb 5 is formed with a squared groove or recess 17 to receive a rider 18 slidable therein. Said riders have sash cords 19 extended into the upper end thereof and secured firmly thereto. Said sash cords extend upwardly from the upper end of the sash and over the pulleys 20 and are understood as having weights thereon, in accordance with the usual construction of windows of this type. The riders 18 may be locked in lowered position by means of bolts 22 slidable in barrels or sleeves 23 secured upon the inner face of the window jamb by screws 24. The said bolts are formed with a short knob or handle 25 connected with the bolt and slidable in a slot 26 in the side of the barrel, said slot having offset portions at each end by means of which the bolt can be secured in locked or unlocked position. The bolts are adapted to project into small recesses 27 in the forward sides of the riders, as shown in Figs. 1 and 2.

As shown particularly in Fig. 4, each rider is formed with a bayonet slot 28 at the lower end, said slot having an opening 29 toward the forward portion of the rider. At the upper end of the rider is a groove 30 which extends downwardly from the upper end for a short distance, said groove having an opening 31 toward the forward side of the rider at a point spaced somewhat from the lower end.

The window sash is formed with opposite pairs of laterally projecting pins 32 thereon, said pins being set in the sash at points spaced slightly from the upper and lower ends, as shown particularly in Fig. 1. These pins are secured firmly in the sash and project outwardly to fit within the grooves 28 and 30. When the sash is in its lowered position relative to the riders, the pins 32 are seated in the lower ends of said grooves.

In operating this window, the sash, together with the riders 18, may be raised and lowered in the same manner as are other windows wherein the rider is an integral part of the sash. When it is desired to reverse the sash so as to obtain access to the face of the outer window pane, the riders are locked in position by means of the bolts 22. The sash is then lifted by sliding pins 32 upwardly in the slots 28 and 30. This will place the sash in the dotted line position indicated at the left in Fig. 1. The sash may then be swung outwardly at the lower end, the lower pin 32 passing through the opening 29 and allowing the sash to swing forwardly into the central position indicated at A in Fig. 1. This swinging movement is accommodated through the beveled faces 15 and 16 in the window cross plates. The window is then lowered to bring the upper pins 32 downwardly into the lower end of the slot 30. The window is then pivoted on the upper pins and may be swung forwardly into the room toward the operator and raised to expose the outer face of the window sash. At B in Fig. 1 the sash is swung only partly up into its extreme range of movement.

If it is desired to remove the sash entirely for cleaning or otherwise, the sash may be moved forwardly so as to bring the upper pins 32 into line with the opening 31 and then the sash may be pulled forwardly into the room releasing it from the riders. In returning the sash to the frame, the operation is reversed in an obvious manner.

It will be noted that the mounting of the sash enables the window to be operated in the usual manner with the assistance of the sash weights. It is further adapted to be swung inwardly into the room to expose the outer face of the window and with very little further manipulation it may be removed from the rider and cleaned and again inserted into its position in the rider with little difficulty or adjustment. The advantages of this construction will be apparent to those skilled in the art.

Having thus described my invention, what I claim as new and desire to protect by Letters Patent is:

1. A window including a casing and a sash, slideways in the sides of said casing, riders in said slideways, said riders having upper and lower grooves therein, upper and lower pins on said sash fitting within said grooves, said pins being removable from said grooves at both ends thereof whereby said sash may be removed from the riders.

2. A window including a casing, a single sash therein, said casing having slideways therein for said sash, riders at the sides of said sash slidable in said slideways, means to lock said riders in lowered position, upper and lower pairs of pins on said sash fitting within grooves in said riders, said pins being slidable in said grooves to allow the lower end of the sash to swing inwardly about said upper pins, said upper pins being thereafter removable from said slots.

3. A window including a casing, a single sash therein, said casing having slideways therein for said sash, riders at the sides of said sash slidable in said slideways, means to lock said riders in lowered position, and upper and lower pairs of pins on said sash fitting within grooves in said riders, said pins being slidable in said grooves to allow the lower end of the sash to swing inwardly about said upper pins.

4. A window including a casing, a single sash therein, said casing having slideways therein for said sash, riders at the sides of said sash slidable in said slideways, means to lock said riders in lowered position, upper and lower pairs of pins on said sash fitting within grooves in said riders, said pins being slidable in said grooves, the pins at the lower end being releasable from said grooves to allow said sash to be swung on the other pins to expose the outer face of the sash inwardly.

5. The combination with a window casing having vertical slideways, of a rider movable in each slideway, a sash between said riders, each rider and the adjacent side of said sash being provided, one with upper and lower open bearings and the other with upper and lower sets of pintles which work in said bearings.

6. The combination with a window casing having vertical slideways, of a rider movable in each slideway, a sash between said riders, each rider and the adjacent side of said sash being provided, one with upper and lower elongated open bearings and the other with pintles which work in said respective bearings.

7. The combination with a window casing having vertical slideways, a rider movable in each slideway, each rider having an elongated upper and lower bearing whose upper ends are open, a sash between said riders, pintles carried by said sash and working in the respective rider bearings.

8. The combination of a window casing, riders slidable in said casing, a sash on said riders, upper and lower pintles on said sash engaging in upper and lower grooves in said riders, both said pintles being adapted to move free of said grooves.

9. In a window, a casing having slideways therein, riders slidable therein, said riders having upper and lower bearing grooves therein, said upper grooves having their upper ends open, upper and lower pintles on said sash engaging said upper and lower grooves, said upper pintles being releasable from said grooves to allow said sash to swing inwardly.

10. In a window, a casing having slideways therein, riders slidable therein, said riders having upper and lower bearing grooves therein, said upper grooves having their upper ends open, upper and lower pintles on said sash engaging said upper and lower grooves, said upper pintles being releasable from said grooves to allow said sash to swing inwardly, said sash being then releasable from said riders.

In testimony whereof I hereunto affix my signature this the 13th day of December, A. D. 1927.

CLAUDE A. LEWIS.